United States Patent [19]

Cheetham

[11] Patent Number: 5,199,363

[45] Date of Patent: Apr. 6, 1993

[54] METHOD AND APPARATUS FOR MAKING SOLID WASTE MATERIAL ENVIRONMENTALLY SAFE USING HEAT

[75] Inventor: Eric Cheetham, Cogan Station, Pa.

[73] Assignee: Phoenix Environmental, Ltd., Montgomery, Pa.

[21] Appl. No.: 792,515

[22] Filed: Nov. 13, 1991

Related U.S. Application Data

[60] Division of Ser. No. 533,653, Jun. 4, 1990, Pat. No. 5,065,680, which is a continuation-in-part of Ser. No. 410,560, Sep. 21, 1989, Pat. No. 4,960,380.

[51] Int. Cl.$^5$ ............................................. F23J 15/00
[52] U.S. Cl. ..................................... 110/215; 110/216
[58] Field of Search ........................ 110/215, 216, 238

[56] References Cited

U.S. PATENT DOCUMENTS

| | | |
|---|---|---|
| 1,130,212 | 3/1915 | Steere . |
| 2,800,091 | 7/1957 | Lotz et al. . |
| 2,917,011 | 12/1959 | Korner . |
| 2,979,000 | 4/1961 | Sifrin et al. . |
| 2,983,847 | 5/1961 | Spengler . |
| 3,440,800 | 4/1969 | Messen-Jaschin . |
| 3,656,441 | 4/1972 | Grey et al. . |
| 3,722,733 | 3/1973 | Neumann . |
| 3,771,468 | 11/1973 | Kelly . |
| 3,780,675 | 12/1973 | Frye et al. . |
| 3,831,535 | 8/1974 | Baardson .............................. 110/216 |
| 3,832,519 | 8/1974 | Wolf et al. . |
| 3,834,326 | 9/1974 | Sowards . |
| 3,910,207 | 10/1975 | Altmann . |
| 3,913,499 | 10/1975 | Watts . |
| 3,918,374 | 11/1975 | Yamamoto et al. . |
| 3,954,381 | 5/1976 | Marecaux .............................. 110/215 |
| 3,996,862 | 12/1976 | Besik et al. .......................... 110/215 |
| 4,012,301 | 3/1977 | Rich et al. . |
| 4,038,108 | 7/1977 | Engel et al. . |
| 4,167,463 | 9/1979 | Conrad . |
| 4,181,504 | 1/1980 | Camacho . |
| 4,213,404 | 7/1980 | Spaulding . |
| 4,253,409 | 3/1981 | Wormser . |
| 4,266,948 | 5/1981 | Teague et al. . |
| 4,279,208 | 7/1981 | Guillaume et al. . |
| 4,291,634 | 9/1981 | Bergsten et al. . |
| 4,308,807 | 1/1982 | Stokes . |
| 4,320,709 | 3/1982 | Hladun . |
| 4,344,920 | 8/1982 | Issenlis ................................ 110/215 |
| 4,346,661 | 8/1982 | Nakamura . |
| 4,367,130 | 1/1983 | Lemelson . |
| 4,384,968 | 5/1983 | Polizzotti et al. . |
| 4,397,823 | 8/1983 | Dimpfl . |
| 4,398,471 | 8/1983 | Thomanetz . |
| 4,408,985 | 10/1983 | Anderson et al. . |
| 4,411,695 | 10/1983 | Twyman . |
| 4,417,529 | 11/1983 | Fujimoto et al. . |
| 4,432,344 | 2/1984 | Bennington et al. . |
| 4,438,705 | 3/1984 | Basic, Sr. . |
| 4,438,706 | 3/1984 | Boday et al. . |
| 4,447,262 | 5/1984 | Gay et al. . |
| 4,479,443 | 10/1984 | Faldt et al. . |
| 4,509,434 | 4/1985 | Boday et al. . |
| 4,526,712 | 7/1985 | Hirano et al. . |

(List continued on next page.)

Primary Examiner—Henry C. Yuen
Attorney, Agent, or Firm—Panitch Schwarze Jacobs & Nadel

[57] ABSTRACT

Harmful constituents are removed from non-combustible solid waste, such as incinerator ash, by continuously feeding a mixture of the solid waste and a combustible excitation material into a reaction chamber, igniting the mix in said chamber and causing it to react in the presence of oxygen until the heat of the reaction causes the solid waste material to become a molten slag and the temperature within the chamber above the molten slag is high enough to destroy substantially all of the harmful constituents in the gaseous effluent released by the formation of the molten slag. The excess molten slag is conducted from the reaction chamber. The effluent is conducted from the reaction chamber into a second chamber where it is rapidly cooled to cause particulate material to precipitate out of the effluent. The effluent is thereafter treated to remove substantially all of the remaining particulate and harmful gases to achieve acceptable environmental quality. The thus treated effluent is released into the atmosphere.

5 Claims, 8 Drawing Sheets

U.S. PATENT DOCUMENTS

| | | |
|---|---|---|
| 4,539,916 | 9/1985 | Paoluccio . |
| 4,552,667 | 11/1985 | Shultz . |
| 4,574,714 | 3/1986 | Bach et al. . |
| 4,579,067 | 4/1986 | Peters . |
| 4,579,069 | 4/1986 | Gay et al. ............................ 110/216 |
| 4,582,004 | 4/1986 | Fey et al. . |
| 4,599,955 | 7/1986 | Hepworth et al. . |
| 4,602,574 | 7/1986 | Bach et al. . |
| 4,615,283 | 10/1986 | Ciliberti et al. . |
| 4,615,285 | 10/1986 | Bentell et al. . |
| 4,631,384 | 12/1986 | Cornu . |
| 4,644,877 | 2/1987 | Barton et al. . |
| 4,651,656 | 3/1987 | Wallner et al. . |
| 4,685,220 | 8/1987 | Meenan et al. . |
| 4,685,404 | 8/1987 | Sheppard et al. . |
| 4,688,495 | 8/1987 | Galloway . |
| 4,695,447 | 9/1987 | Shultz . |
| 4,695,448 | 9/1987 | Anthony . |
| 4,702,808 | 10/1987 | Lemelson . |
| 4,718,362 | 1/1988 | Santen et al. . |
| 4,724,776 | 2/1988 | Foresto . |
| 4,732,091 | 3/1988 | Gould . |
| 4,751,887 | 6/1988 | Terry et al. ............................ 110/216 |
| 4,759,300 | 7/1988 | Hansen et al. . |
| 4,771,361 | 9/1988 | Varga . |
| 4,781,171 | 11/1988 | Hemsath . |
| 4,793,270 | 12/1988 | Karasek et al. . |
| 4,821,653 | 4/1989 | Jones . |
| 4,848,995 | 7/1989 | Samish . |
| 4,873,930 | 10/1989 | Egense et al. . |
| 4,886,000 | 12/1989 | Holter et al. . |
| 4,909,160 | 3/1990 | Frick et al. . |
| 4,958,578 | 9/1990 | Houser ................................ 110/216 |
| 4,987,839 | 1/1991 | Krigmont et al. .................... 110/216 |

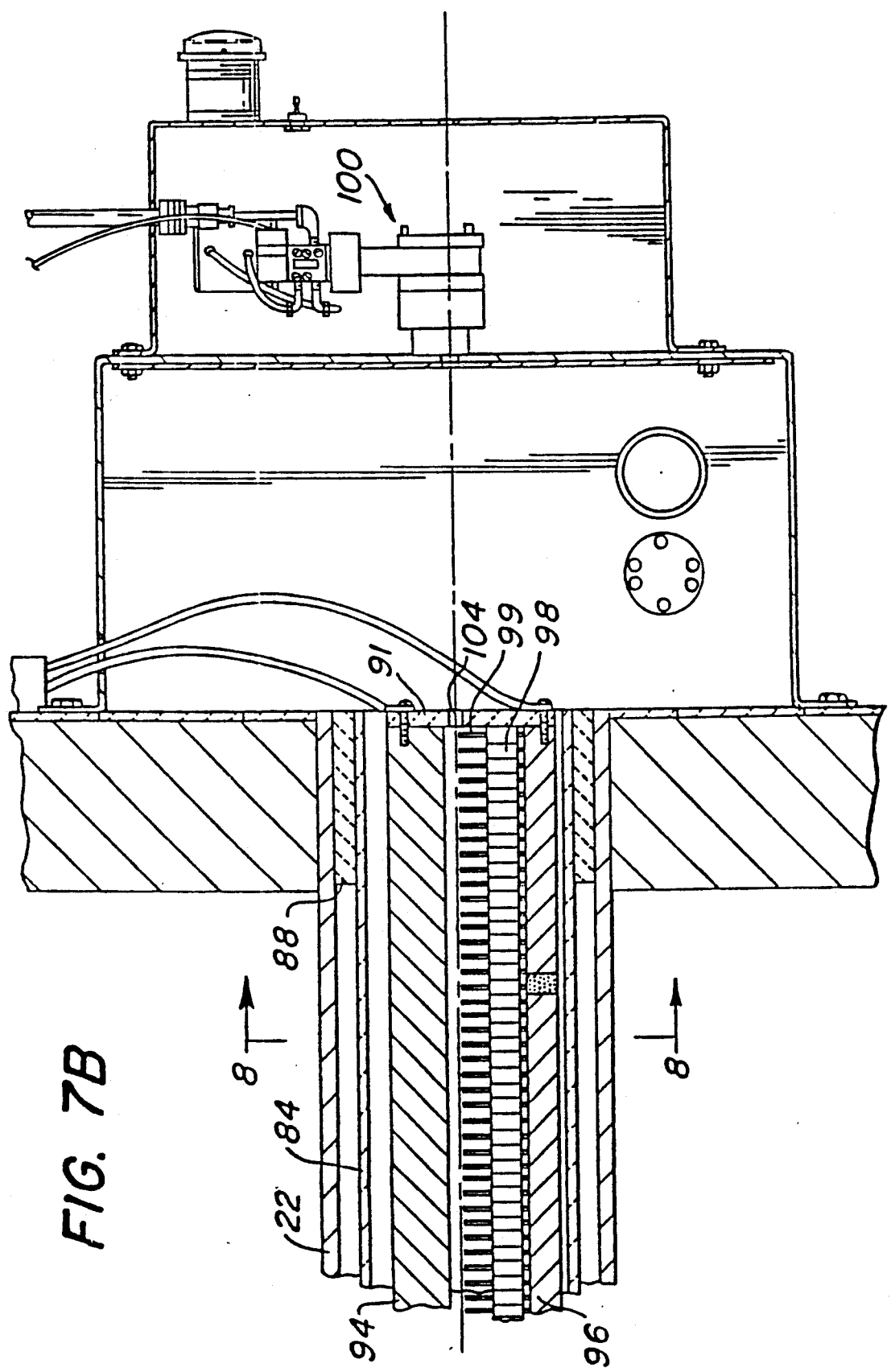

METHOD AND APPARATUS FOR MAKING SOLID WASTE MATERIAL ENVIRONMENTALLY SAFE USING HEAT

This is a division of application Ser. No. 07/533,653, filed Jun. 4, 1990, now U.S. Pat. No. 5,065,680, which is a continuation-in-part of application Ser. No. 07/410,560 filed Sep. 21, 1989, now U.S. Pat. No. 4,960,380.

BACKGROUND OF THE INVENTION

1. Field of the Invention

The disposal of solid waste material, particularly hazardous waste material, is a continuing problem. Hazardous waste materials must be properly handled to avoid damage to humans and the environment.

This invention relates to a method and apparatus for making solid waste material environmentally safe using heat. More particularly, this invention relates to a method and apparatus for continuously modifying solid waste material to a ceramic-like composition using heat at high temperatures. The process is initiated by coherent radiation and sustained by an excitation material.

The solid waste may itself be the product of prior combustion such as incinerator ash, especially fly ash. The ash or like material is processed with combustible excitation material which itself may be a waste material. Another example of solid waste material is metal waste including items such as used paint cans, white appliances, waste steel with waste oil, aluminum stampings, all in the form of chips.

The combination of combustible excitation material and the products of prior combustion are heated to sufficient temperature to reduce the waste to a harmless disposable ceramic-like material and an effluvia of gas and particulates in the presence of oxygen. The effluvia is cleansed of remaining harmful materials, such as heavy metals, and otherwise processed for safe disposition into the atmosphere. The ceramic-like product of the present invention is crystal-like hard material which is environmentally safe.

Incineration of waste material is a principal method of waste disposal. However, the ash by-product of incineration (commonly called fly ash and bottom ash) is itself considered to be a undesirable waste since it contains heavy metals and other hazardous substances such as arsenic and organic compounds such as dioxins. Such substances are dangerous to humans and will contaminate the environment unless the ash is disposed of in a safe manner. Safe disposal is costly and represents an ever present risk to the environment. It is therefore desirable to provide a method and apparatus for further transforming ash and other solid wastes to materials which are suitable for environmentally safe disposal or even as useful products. It is also desirable to provide a method and apparatus for the transformation of solid waste materials considered to be extremely hazardous such as solid medical wastes. The present invention is directed to a method and apparatus for the transformation of such solid waste materials using heat applied at high temperatures.

2. Description of the Prior Art

Methods and apparatus for reducing materials to separable constituents, including waste materials, using coherent radiation have been proposed in the past, but none is known to be commercially in use. The modification by pyrolysis of solid materials in a plasma is also known, although such plasmas are not necessarily initiated by directing coherent radiation at the material to be modified.

Other deficiencies in high temperature waste treatment processes have limited their utility. These involve difficulties in processing the effluvia of the combustion process which are themselves hazardous and therefore have required costly special treatment. Other deficiencies are that gas/electrode plasma systems have very limited duty life, i.e., 50 hours is the average life-time expectancy.

SUMMARY OF THE INVENTION

In accordance with the present invention, solid waste is transformed by heat in the presence of oxygen and an excitation material to a slag-like material from which has been removed the environmentally harmful constituents. The solid waste material may be conventional solid wastes but the present invention is principally intended for the transformation of the ash by-product of prior incineration, especially fly ash. The process is also applicable to metal waste as previously described. The effluvia of the process take the form of particulates and the gaseous by-products of the process. In accordance with the present invention, the particulates are electrostatically removed and filtered from the effluvia. The gas is processed to destroy or chemically convert harmful constituents. The remaining gas is then safely exhausted into the atmosphere.

Thus the present invention is directed to a method and apparatus for the continuous as opposed to batch transformation of solid waste material at elevated temperatures, especially incinerator ash and steel or aluminum waste as previously described. Coherent radiation is the initial source of energy for rapidly igniting the process. The process is sustained by adding to the solid waste, as necessary, an aggregate of more readily combustible excitation materials. These combustible excitation waste materials may be waste materials (herein excitation waste) which have not yet been burned or conventional sources of energy such as coal or wood chips. The conversion of the effluvia to environmentally acceptable gases which can be atmospherically exhausted is a part of the process.

The present invention has particular utility in that it uses coherent radiation produced by a laser to provide rapid excitation of the waste material. The coherent radiation is provided by a $CO_2$ laser.

In accordance with the present invention solid waste material, especially a product of prior incineration and metal waste, is fused in a reaction chamber. Heating takes place in the presence of oxygen and an excitation material (e.g. coal) causing the waste material to reform into a ceramic-like material and an effluvia of gas and particulates. The process is excited by coherent radiation, and where the waste material is fly ash or the like, excitation material is included to sustain the process. The effluvia passes from the reaction chamber to a second chamber where its temperature falls rapidly. The high temperature of the first chamber (above 2,000° F.) followed by the rapid drop in temperature in the second chamber removes approximately 80% of the undesirable constituents from the effluvia (i.e. products of combustion and inorganics). The remaining undesirable constituents are removed by further processing of the effluvia.

The apparatus for accomplishing the process includes a primary reaction chamber within which the solid waste and excitation materials are heated in the presence of oxygen; a second chamber wherein further transformation of the effluvia takes place; electrostatic precipitators for removing metal particulates from the effluvia; and gas treatment apparatus which includes precipitation through cooling, filtering and quenching, for further transforming the effluvia into a gas which can be safely discharged into the atmosphere. The slag-like product of the present invention may be produced in small pebbles which are sufficiently free of hazardous contaminants so as not to require environmental listing, and therefore can be safely disposed of.

BRIEF DESCRIPTION OF THE DRAWINGS

For the purpose of illustrating the invention, there is shown in the drawings forms which are presently preferred; it being understood, however, that this invention is not limited to the precise arrangements and instrumentalities shown.

FIGS. 7A and 7B are longitudinal sectional views of a precipitator used with the system apparatus.

DESCRIPTION OF THE PREFERRED EMBODIMENT

Figure 1:
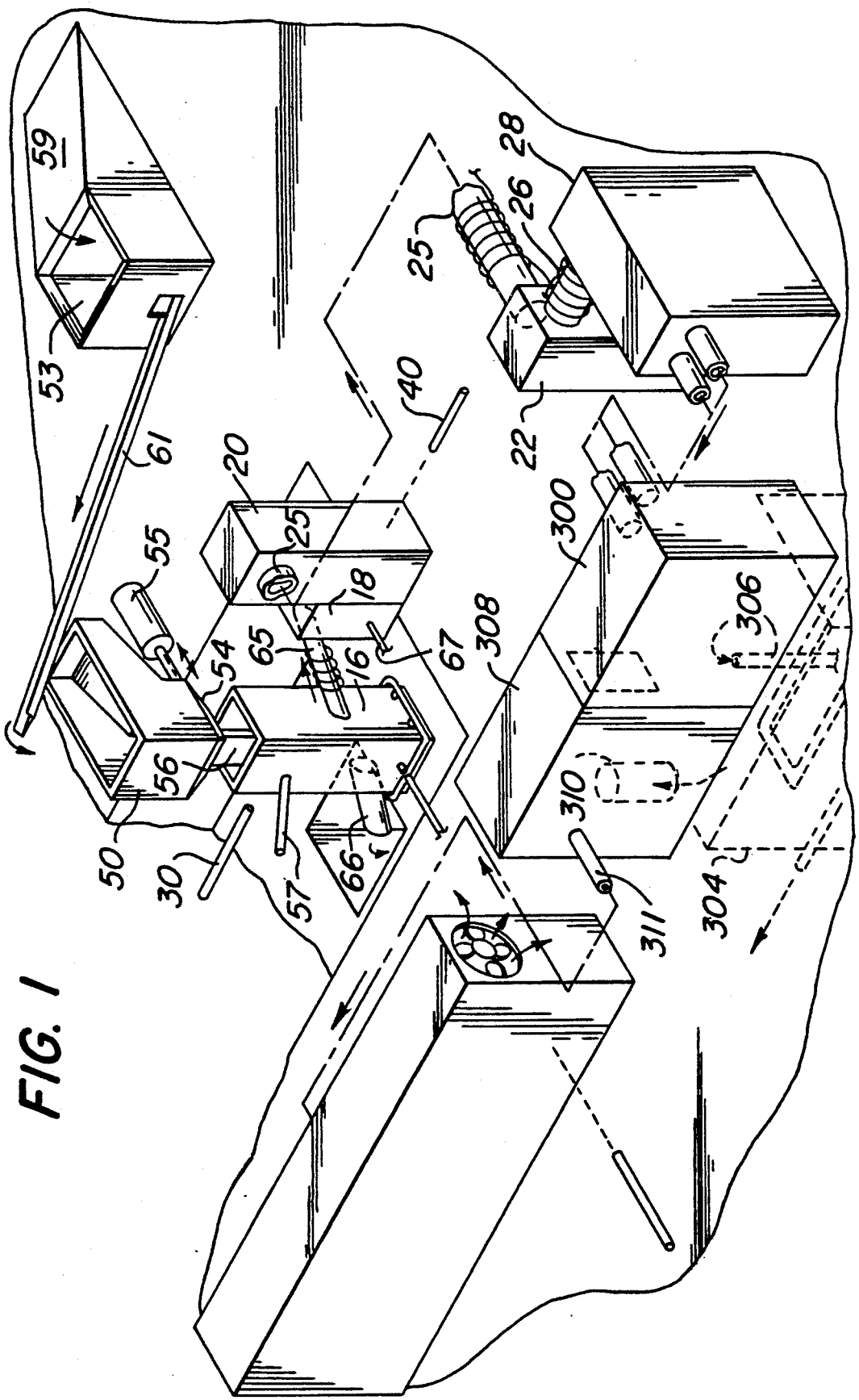
FIG. 1 is a schematic layout of the system apparatus used to perform the process of the present invention.

Referring now to the drawings in detail, wherein like numerals indicate like elements, FIG. 1 schematically illustrates the system apparatus for implementing the process for making solid waste material environmentally safe using heat. The overall structure is shown in more detail in FIGS. 2 and 3.

The masonry structure 10 houses the major components of the apparatus including the reaction chamber 16 in which the solid waste material is transformed to slag. Masonry structure 10 preferably is made of steel reinforced concrete. Temperature sensors 12 are positioned within the structure 10 to monitor the heat absorbed by the masonry. Such temperature sensors are connected to appropriate control and safety systems (not shown) for monitoring the temperatures within the walls to prevent crumbling and other adverse effects of heat on the masonry. The interior of each of the reaction chambers is covered with Francet ® or a similar heat resistant ceramic material. Heat exchangers (partly shown) surround the primary reaction chamber 16. Heat exchangers to provide sufficient cooling may be used as needed.

Positioned within the masonry structure 10 is an inner confinement structure 14 made of refractory brick. The inner confinement structure 14 provides the principal means for housing the reaction chamber 16 and second chamber 18, the primary and secondary stacks (or flues) 20 and 22, the precipitator 25, and the heat exchangers for cooling the gaseous and particulate effluvia of the process. More particularly, located within the inner confinement chamber 14 is the primary reaction chamber 16, the second chamber 18, the primary stack or flue 20, the secondary stack or flue 22, electrostatic precipitator 25, heat exchanger 26, and third chamber 28. The operation and functional interrelationship of each of the foregoing elements is explained hereinafter.

Located outside of the structure 10 is a carbon dioxide ($CO_2$) laser 30 whose optical axis 32 passes through the primary reaction chamber 16 to provide energy for initiating the heating process used to transform the solid waste material. The coherent radiation generated by the laser 30 passes along optical axis 32 through apertures 34 and 48 in the masonry structure 10 and confinement wall 14, respectively. Aperture 34 is controlled by a light valve 36. The optical axis 32 passes through apertures 34, 48 in the walls of reaction chamber 16 to the point of excitation 38 therein. The optical axis 32 is preferably pitched at an axis of from 5° to 10° from the horizontal.

The optical axis 32 is aligned with the optical axis of the helium neon laser 40. Laser 40 is used to properly align the laser 30 by directing visible coherent radiation along the optical axis 32 through the point of excitation 38. A visible light laser, such as laser 40, is required because the radiation emitted by a $CO_2$ laser is not visible.

Due to the length of the optical path 32, it is necessary to provide a means for aligning the coherent radiation emitted by laser 30. This is accomplished using the helium-neon laser 40 as an auto collomator. The auto collomator guides adjustment of the optical axis 32, left, right, up or down. It also adjusts its azimuth. Although other auto collomators are available, an Accu-ray 1007 available from Phoenix Environmental Ltd., the assignee of this invention, may be used as the auto collomator. Of course, other optical means for aligning the radiation emitted by $CO_2$ laser 30 along an optical axis 32 may be used as desired.

The principal purpose of the present invention is to provide an apparatus and process for transforming solid waste materials, especially fly ash, to a slag or ceramic-like solid material and a gaseous effluent. The gaseous effluent is supplementally processed to remove harmful particulates. The effluent is also processed to convert or neutralize other constituents to make it safe for release into the atmosphere. The present invention finds particular utility in the use of coherent radiation to initiate a high temperature process (2,000° F. to 4,000° F.) for transforming solid waste materials which cannot be reduced by conventional combustion, such as fly ash or waste materials which cannot be safely burned in a conventional manner such as medical waste.

Fly ash is a by-product of conventional combustion processes such as municipal incineration. As such, it will no longer readily burn in a conventional sense, that is by oxidation. It is therefore necessary to provide high temperatures in order to separate the ash into its constituents for removal of undesirable constituents. It is also desirable to convert the ash into a crystal-like material (herein also called slag). This effectively locks in or binds any remaining undesirable constituents to prevent them from leeching or otherwise entering the environment when the ceramic-like product of this invention is stored at an outdoor disposal site or put to useful purpose.

It should be noted that the solid product resulting from the process described herein is called a slag. But the product is not the slag which is a by-product of steel making. This term is chosen simply to characterize the products' hard, crystal-like physical appearance. The slag's actual chemical make-up is determined by chemical and physical analysis and depends on the solid waste material.

Transformation of fly ash requires high temperatures to separate the constituent materials. Such temperatures are generated by combining the solid waste with combustible materials such as combustible waste materials, coal or wood chips, and oxygen. The combustible materials act as a fuel to provide heat at a high temperature for effecting the desired transformation of the solid waste materials. Another feature of this invention is the use of continuously fed particulates to create an effective volume of material.

While the transformation of the solid waste material is taking place, the liquid slag is removed from the primary reaction chamber through a slag receiving opening 42. The effluvia of gases and particulates which have been generated by the combustion process are further treated as hereinafter described.

Figure 4:
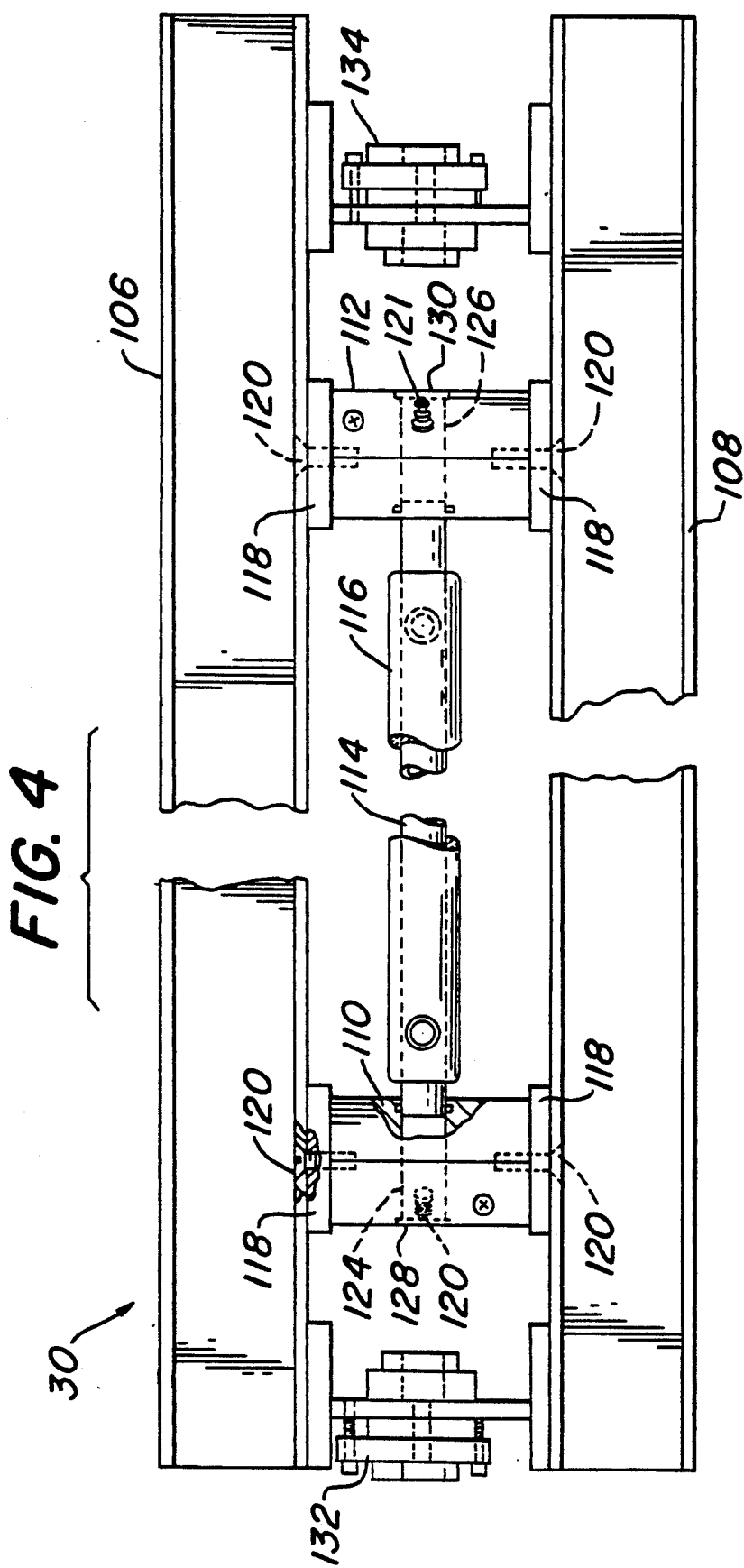
FIG. 4 is a longitudinal sectional view of the $CO_2$ laser used with the present invention.

Laser 30, as more particularly shown in FIG. 4, is mounted between aluminum I-beams 106, 108. I beam 108 is rigidly fixed to a granite slab, not shown. Laser 30 is preferably a 250 watt/cw carbon dioxide ($CO_2$) laser. Such lasers are available in the open market and any appropriate brand of laser may be selected for use with the present process. However, the laser used with the present invention is constructed by the inventor and is of the type illustrated in FIG. 4.

The coherent infrared radiation generated by laser 30 passes along optical path 32 through aperture 34 in the wall of masonry structure 10. Aperture 34 is a 4" diameter gate valve angled approximately 20, from the axis of the laser to deflect the laser beam when the valve is closed, otherwise the laser would deflect back on itself. Aperture 34 is controlled by light valve 36, which functions to stop the laser beam and deflect the power at an angle. The aperture 34 (and all other apertures in the optical axis 32) is precisely aligned with the optical axis so as to permit entrance of the radiation through structure 10 and into the confinement chamber 14 (through aperture 48) while at the same time minimizing the escape of effluents.

It should be noted that it is not necessary to focus the coherent radiation. However, the coherent radiation is collomated.

Heat exchanger 46 is connected to a reservoir of cooled liquid (e.g. water) for maintaining the light valve 36 and chamber wall at proper operating temperatures.

The coherent radiation also passes through a opening into primary reaction chamber 16 and through the point of excitation 38.

Solid waste and excitation material is fed from hopper 50 into the primary reaction chamber through gate valve 54 controlled by actuator 55. The feed material is conveyed by conveyor 61 into hopper 50 from tipping bay 53 at the end of loading ramp 59. The feed material falls through tube 56 where it may be partially preheated. Thus, the combined solid waste and excitation material to be treated according to the process and apparatus of the present invention flows into the primary chamber 16 to the area encompassing the point of excitation 38. See FIG. 3. Preferably the flow is assisted by recirculated gases from the process released down the reaction chamber 16. Recirculated gases from compressor 316 (FIG. 10) are emitted into tube 56 from pipe 57. Tube 56 may be Pyrex ® lined. Recirculated gases are also directed into chamber 16.

Reaction chamber 16 is divided into a primary reaction core 77 and a primary reservoir 79. Reaction chamber 16 is 9.75"×15" in Width and length. Initial excitation of the solid waste and excitation material takes place in core 77. The slag thus formed overflows into reservoir 79. Once the reservoir 79 is filled, slag flows through exit tube 66 whose entrance is at a higher level than the floor of core 77.

The apparatus also includes chamber 18. This chamber is used to rapidly cool the effluvia flowing from reaction chamber 16 through inclined tube 64. The interior of both chambers 16 and 18 is coated with a hard, heat resistant material such as refractory brick or ceramic lining.

Within the primary chamber 16, the excitation material and the solid waste is raised to temperatures exceeding 2,000° F. (e.g. 3,000° F. or above).

The excitation material mixed with the solid waste material is held in hopper 50 and then fed directly into reaction chamber 16. The preferred mixture is 50% solid waste and 50% excitation material by weight although other mixtures may be used if they does not adversely effect the quality of the effluvia discharged into the atmosphere.

The principal reaction takes place in chamber 16 where, in the presence of oxygen, the temperature of the solid waste material (and the excitation material) is raised to temperatures high enough to cause the solid waste to liquify and fuse. Also an effluvia of gases and particulates is formed. The effluvia flows up the tube 64 into the second chamber 18. The effluvia also flows through water cooled exhaust tube 65 to chamber 20. The major constituent of solid waste forms a molten, slag-like material. The molten slag fills the reaction core 77 and flows into the primary reservoir 79 until it too is filled. The entire reservoir 77, 79 fills until slag flows out through exit tube 66 to lava receiving tube 42. Slag flows through tube 42 into a receiving container 43 which, when filled, transports the slag to another location.

The reduction process is initiated by placing a mixture of excitation material and waste material (e.g. coal and steel waste as previously described) in a small ladle 87 positioned at the excitation point 38. The excitation point 38 may be 4 to 5 inches above the floor of the reaction chamber 16. Preferably the starting mixture is simply piled on the floor of chamber 16 and the laser beam from laser 30 directed at it. One of many advantages of using a laser is that it can be directed where desired on the starting mixture. By way of example, the starting mixture may be 10 to 15 lbs. of coal and an equal amount of steel chips. The solid waste could also be "rebar" which is reinforced concrete rubble. This material is heated by the coherent radiation to near starting temperatures.

Oxygen is also introduced once the starting mixture has reached the requisite temperature. In particular, oxygen from a source 68 is piped through 6 lances 70 into the reaction chamber 16 at the rate of 2,000 ft$^3$ per hour. Lances 70 are arranged around the periphery of chamber 16 so as to introduce the oxygen at a chord angle to the vertical axis of the chamber. Thus, the oxygen swirls in a vortex within the chamber. The movement of the oxygen enhances the heating process.

A feature of the present invention is the use of particulate waste material to start and maintain the process. The initial pool of molten material in itself is not commercially capable of handling volumes of waste. This small reaction is accelerated, with oxygen and previously described waste, to a large viable pool of high temperature liquid which is capable of handling commercial volumes of waste. It has been found that although it is possible to reach desired temperature by directing the coherent radiation into a solid block of waste material, the pool of molten material is too small to be effective. By using a aggregate of particulate waste and excitation material, the pool can be excited to fill the base of reaction chamber 16. This expanded pool engulfs the waste material and permits transformation thereof at commercially practicable rates. Initial tests of the process in an experimental chamber have resulted in waste material treatment rates of 33 lbs. per minute without losing air quality for the exhausted effluvia. Present scale up calculations indicate that rates of 10 to 20 tons per 20 hour day should be capable of being accomplished. The process could treat 60 tons/day but this rate would exceed pollution controls.

At start up, the laser 30 is operated at approximately 150 watts per cm (continuous wave (cw)) to excite the starting material to operating temperatures above 2,000° F. Laser 30 is turned off after 3 to 20 seconds which is when the starter material reaches a liquid state at the point of impingement by the laser. Oxygen is introduced into chamber 16 through the lances 70. After several seconds, the reaction becomes self-sustaining and the laser may be shut down at this time.

As previously indicated, a gaseous and particulate effluvia is a principal product of heating the waste material. This gas includes products of combustion and inorganics.

The effluvia flows up the tube 65 to the second chamber 18. The effluvia rapidly drops in temperature as it leaves reaction chamber 16 and flows through chamber 18 (approximately 2,400° F. as it leaves chamber 16 to 1,200° F. to 1,400° F. as it exits chamber 18. This drop in temperature within 3 feet and in about 2 seconds causes the particulates to drop out. It has also been found that the initial heating at above 2,000° F. destroys the organic compounds.

The effluvia passes from the secondary reaction chamber 18 into the primary stack 20. The effluvia passes up the primary stack 20 and through the electrostatic precipitator 25. See FIG. 5. Precipitator 25 is cooled by heat exchanger 74.

Figure 6:
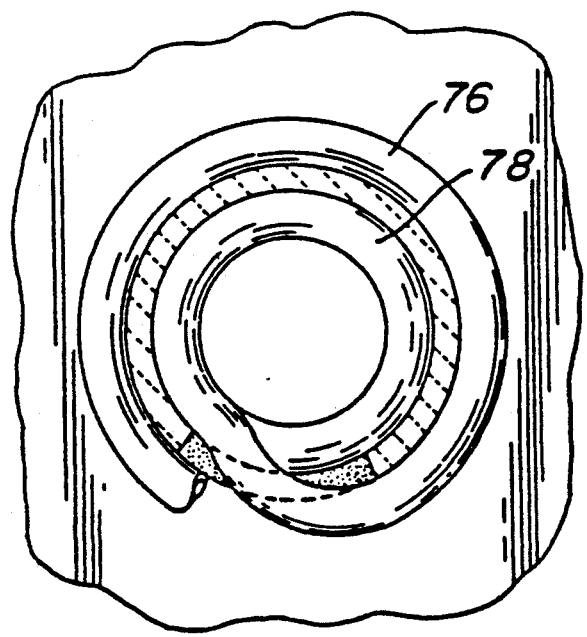
FIG. 6 is a sectional view of the precipitator shown in FIG. 5 taken along the lines 6—6.

The effluvia then passes up secondary stack 22 and into the heat exchanger 26. Heat exchanger 26 comprises a Pyrex ® borosilicate glass tube with both an external heat exchanger 76 and an internal heat exchanger 78. See FIG. 6. Both heat exchangers are liquid cooled.

The heat exchanger 26 reduces the temperature of the effluvia flowing through it from approximately 1,000° F. to 500° F. The cooled effluvia flows into the cooling chamber 28 where it is further reduced in temperature to between 100° and 200° F. Chamber 28 is a refractory walled chamber lined with ceramic. It includes a heat exchanger 260 for further cooling the effluvia.

Figures 5, 8:
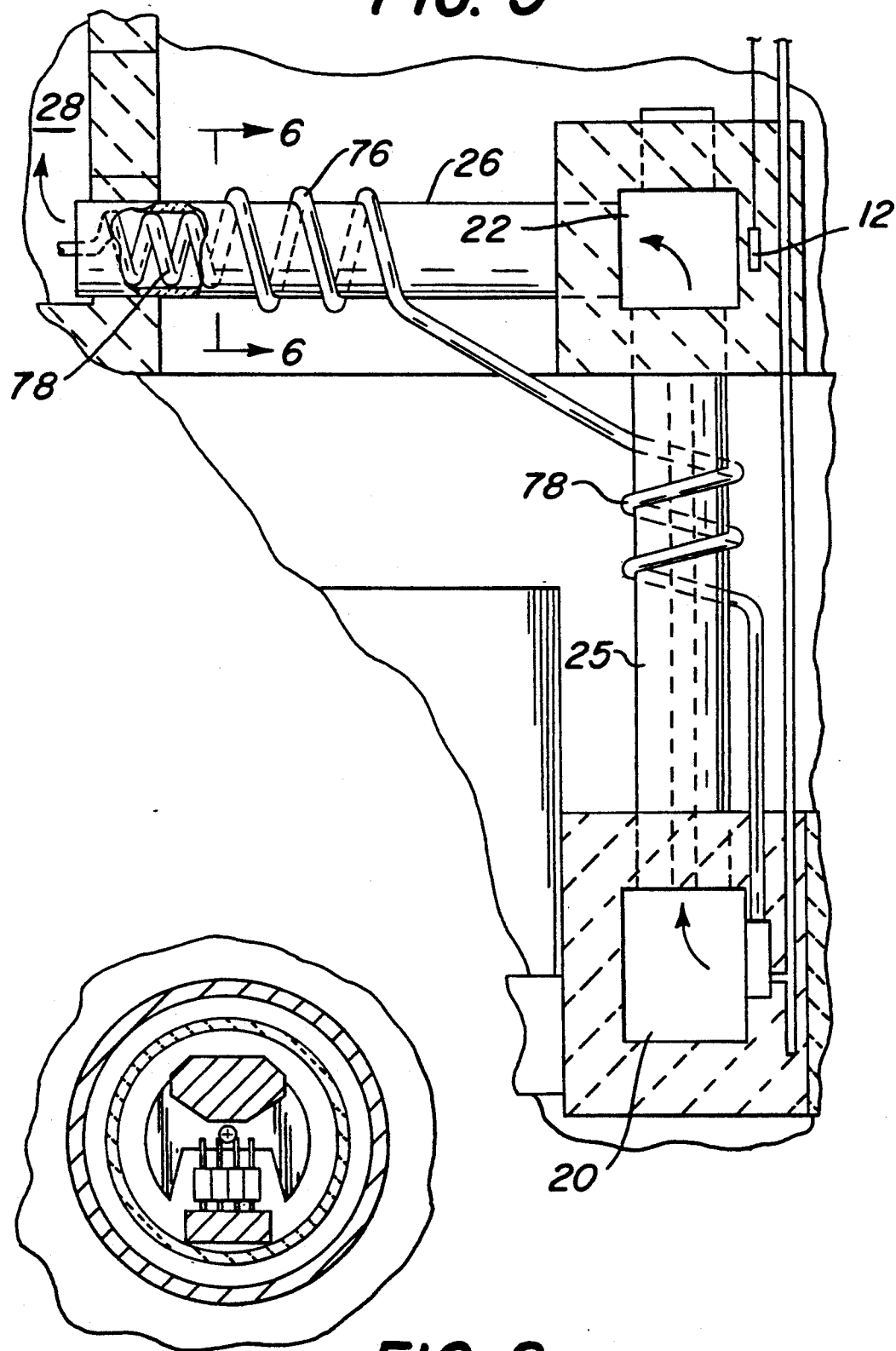
FIG. 5 is a sectional view of the system apparatus taken along lines 5—5 in FIG. 3 showing the primary stack and one of the electrostatic precipitators used with the present invention.
FIG. 8 is a sectional view of the precipitator shown in FIGS. 7A and 7B taken along the lines 8—8.
Figure 7A:
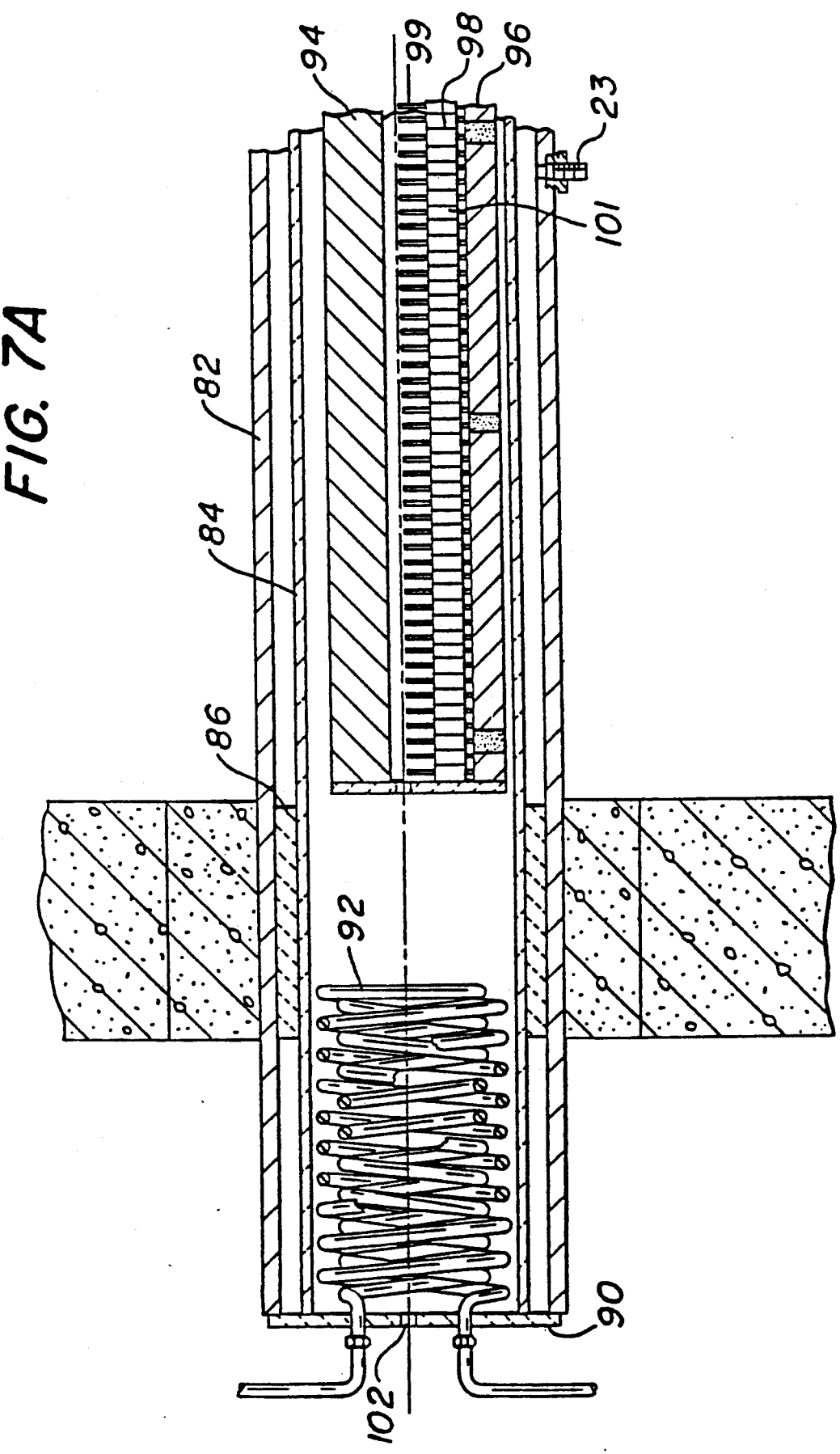

FIGS. 7A, 7B and 8 illustrate the three electrostatic precipitators 24, 24' and 25 used with the process. The precipitators 24 and 24' are identical and differ from precipitator 25 only in that precipitator 25 does not include the gate valve 100 hereinafter described.

As shown, each precipitator is housed within a protective refractory or metallic shell 82 within which is mounted a borosilicate glass (Pyrex) tube 84 held in place by bushings 86 and 88. Tube 84 is 4 feet in length, has an inside diameter of 7", and a wall thickness of 3/16". The entire electrostatic precipitator is approximately 44 inches in length.

One end of the tubes 82, 84 is closed by the plate 90 provided with a central aperture 102 through which the effluent is drawn. The aperture also provides for the admission of coherent radiation from a helium/neon laser for the purpose hereinafter described. Mounted at the entrance end of the precipitators 24, 24' is a heat exchanger 92.

Each precipitator includes an elongated brass electrode 94 mounted above an opposing elongated brass electrode 96 which supports 200 pin resistors 98 mounted in four rows of 50 equally spaced pin resistors along its length. Each of the pin resistors includes a wire pin 99 projecting from a resistive material 101. Each pin resistor is 1,000 ohms and rated at 5 watts. Four rows of 50 pin resistors are provided as illustrated in FIGS. 7 and 8. The distal end of each pin resistor is spaced approximately 1 inch from the opposing surface of the brass electrode 94. Each of the pin resistors is electrically connected to the electrode 96 by a silver solder.

The brass electrodes 94 and 96 are supported by the end plates 90 and 91 which preferably are made of a ceramic, dialectric material. End plates 90, 91 include apertures 102, 104, respectively, through which effluent is drawn into and out of the precipitators. Also coherent radiation from a helium neon laser may pass through the apertures.

The electrodes 94 and 96 are connected to a source of high voltage direct current. Electrode 94 is connected to the negative terminal and electrode 96 is connected to the positive terminal. For example, such source may be 15,000 volts. When the precipitators are operating, there will be a current flow between electrodes of between 5 to 50 milliamps.

For the most efficient operation, the effluent is drawn through the precipitator at a rate of approximately 105 cubic feet per minute (measured at the carbon filter 310) although each precipitator will function less efficiently at higher flow rates. The minimum flow rate for each precipitator is approximately 20 ft$^3$ per minute.

The precipitators 24, 25 expose a large cross section of the electrodes to the gas and, therefore, operate efficiently to remove any ionized particulates remaining in the effluent.

Optional control over the flow of the gas through the precipitators 24, 24' may be provided by an electro neumatic gate valve 100 which includes a sensor for sensing the presence of light provided by a helium neon laser. A helium neon laser (not shown) is mounted with appropriate optics to direct coherent radiation through the apertures 102 and 104 in end plates 90 and 91. The gate valves 100 are not necessary and may be omitted.

In operation, when the sensor detects the presence of the coherent radiation, this is an indication that there is no effluvia present. If however the gas is present, there will be sufficient reduction of the light intensity by the particulate material to scatter the radiation. This is sensed by the sensor indicating the operating status of precipitators.

The electrostatic precipitator operates by creating an electrostatic field between the brass electrode 94 and the pin resistors 98. Particulates entrapped within the gas are attracted to the pin resistors and thus removed from the effluent. Cleanout petcocks 23 are provided.

The electrostatic precipitators 24 and 24' are mounted in the wall of chamber 28; that is, they extend through walls 14 and 10 into the chamber 300. Precipitators 24, 24' may be operated singlely or in parallel as desired.

The $CO_2$ laser 30 is illustrated in FIGS. 4 and 5. As shown, the laser is mounted on I-beams 106 and 108. The I-beam 108 is fixed to a granite slab (not shown). The brass high voltage electrodes 110 and 112 support the gas tube 114 which in turn is covered by a glass cooling jacket 116. The electrodes 110 and 112 are mounted between ceramic insulators 118 and fixed to the I-beams 106, 108 by nylon screws 120. The electrodes 110 and 112 are provided with gas fittings 121 and 122 for connection to a source of carbon dioxide and pumping equipment. The ports 124 and 126 through the electrodes 110 and 112 are closed by zinc selenide windows 128, 130.

High reflectivity mirrors 132 and 134 are mounted at opposite ends of the laser 30. The mirrors are mounted on micro-adjustable precision gimbal mounts for proper adjustment. Mirror 132 is fully reflective whereas mirror 134 is 85% reflective. The output mirror 134 is zinc selenide. The mirror 132 is gold or platinum. A phosphor screen may be selectively inserted in the port 126 to align the front mirror in laser 30.

Figure 2:
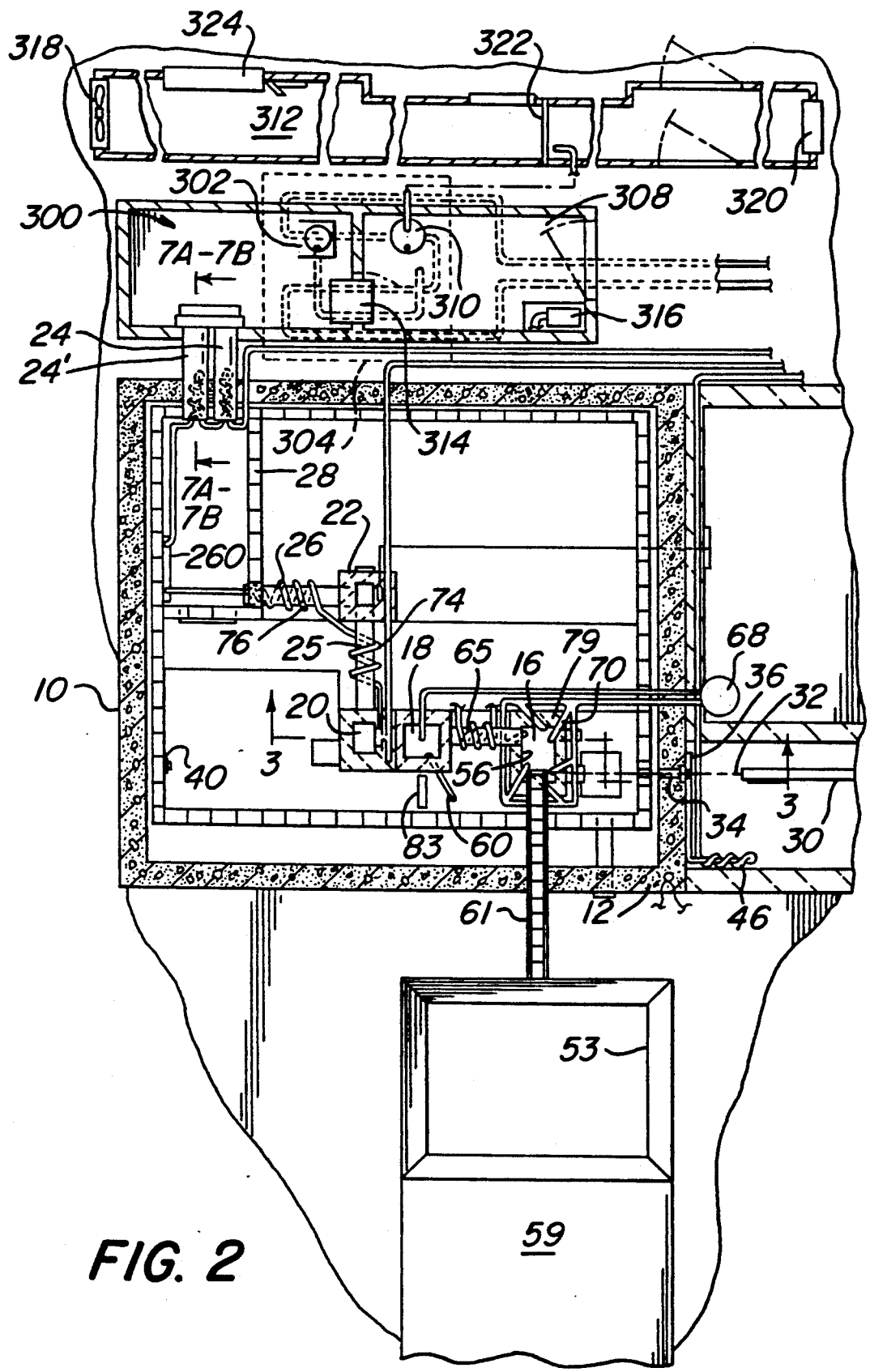
FIG. 2 is a top plan view of the system apparatus with a section taken below the roof or other covering.

As shown in FIGS. 1 and 2, the precipitators 24 and 24' extend through the walls 14 and 10 into the chamber 300 within which is provided one or more vacuum pumps 302. The vacuum pump 302 is designed to create a vacuum which pulls the effluvia through the entire system including the primary and secondary reaction chambers. In operation, the vacuum pump 302 should draw the effluvia through the system at an overall rate of approximately 300-500 cubic feet per minute although other rates may be desirable in some instances.

Figure 9:
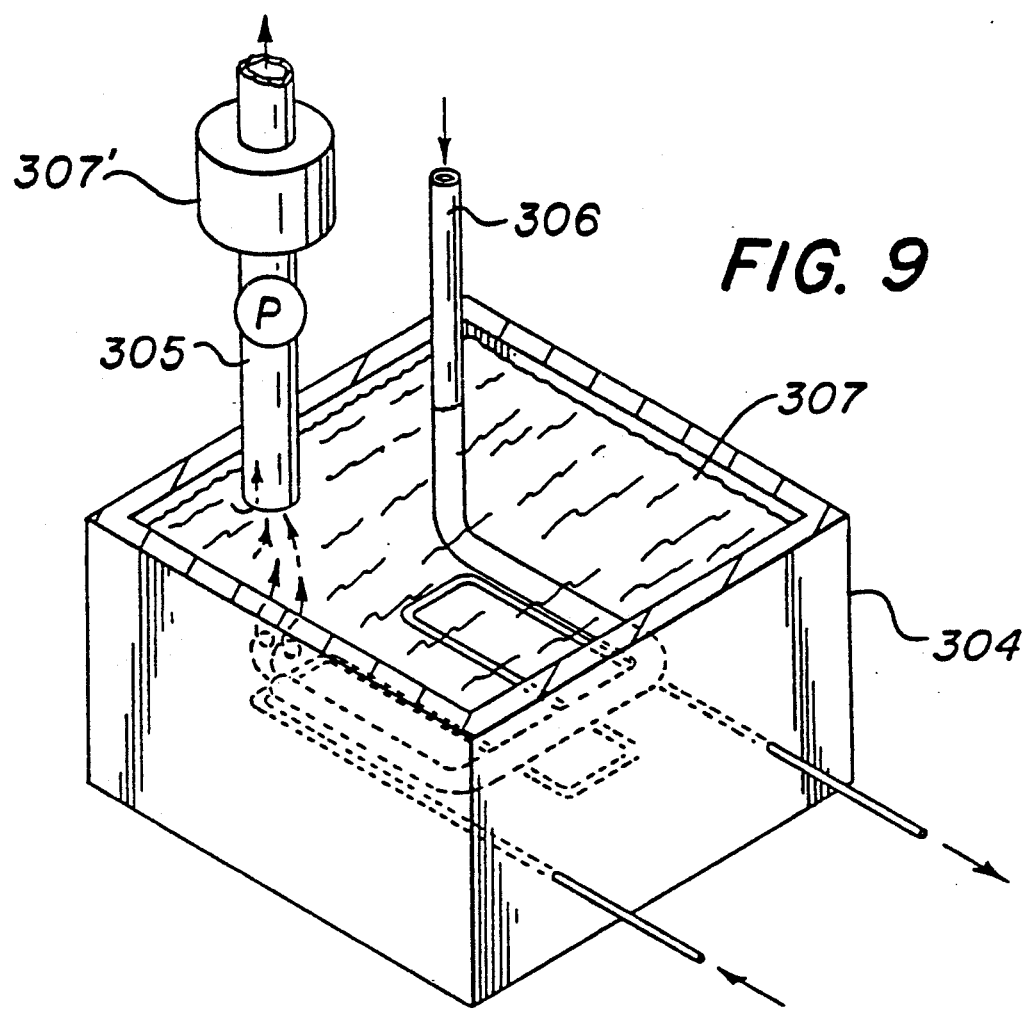
FIGS. 9 is a perspective view of the water pool used a part of the effluvia transformation section of the system apparatus.

The effluvia is pushed by the vacuum pump 302 through pipe 306 into a pool of water 304 located below the chamber 300. The effluvia exits from hole in the lower surface of pipe 306. See FIG. 9. The now scrubbed effluvia bubbles through the water 307 in pool 304. The effluvia next flows through a pipe 305 and pump 307 into the chamber 308.

As best shown in FIG. 1, the effluvia flows through the carbon filter 310 and pipe 311 into the wind tunnel 312. Three filters 310 are used at a total capacity of 400-600 ft$^3$/minute. The chamber 308 also includes a dehumidifier 314 and a compressor 316. The dehumidifier 314, largely used in warm weather, serves to remove moisture from the effluvia. The compressor 316 is used to draw gases from chamber 308 and to recirculate a portion of the effluvia for injection into primary chamber 16. It also can be used to assist in the feeder tube 56 as previously described. The overall flow rate through the compressor is 300 to 600 ft$^3$ per hour at 125 lbs. per square inch. The wind tunnel may includes emissions testing apparatus.

The carbon filter 310 is used to filter substantially all of the remaining particulate matter from the effluvia which then flows into the wind tunnel 312.

The purpose of the wind tunnel 312 is to dilute the effluent, which now consists essentially of carbon dioxide ($CO_2$), oxygen ($O_2$) and water for exhaust into the atmosphere. The wind tunnel 312 includes a fan 318 which draws air into wind tunnel through the heat exchanger 320. As shown, the wind tunnel 312 is an elongated chamber which preferably is set at an approximately 45° angle to the horizontal with the fan 318 at the higher elevation. The wind tunnel 312 is lined with ceramic tile. The horizontal wind tunnel 312 gives easy access for maintenance; allows for a draw or negative pressure throughout the plant; provides easy access for emissions monitoring; and allows for the use of an argon laser for opacity analysis and laser spectrum analysis.

The wind tunnel 312 includes a carbon filter 322 for removing particulate matter from the air prior to mixing the air with the effluent.

Within the wind tunnel, effluent is mixed with air and then exhausted by the fan 316 into the atmosphere. The wind tunnel exhausts mixed air and air quality effluvia at a rate of 5,000 ft$^3$ per minute.

An air quality monitor 324 is mounted on the wall of the wind tunnel 312 adjacent to the fan.

Figure 3:
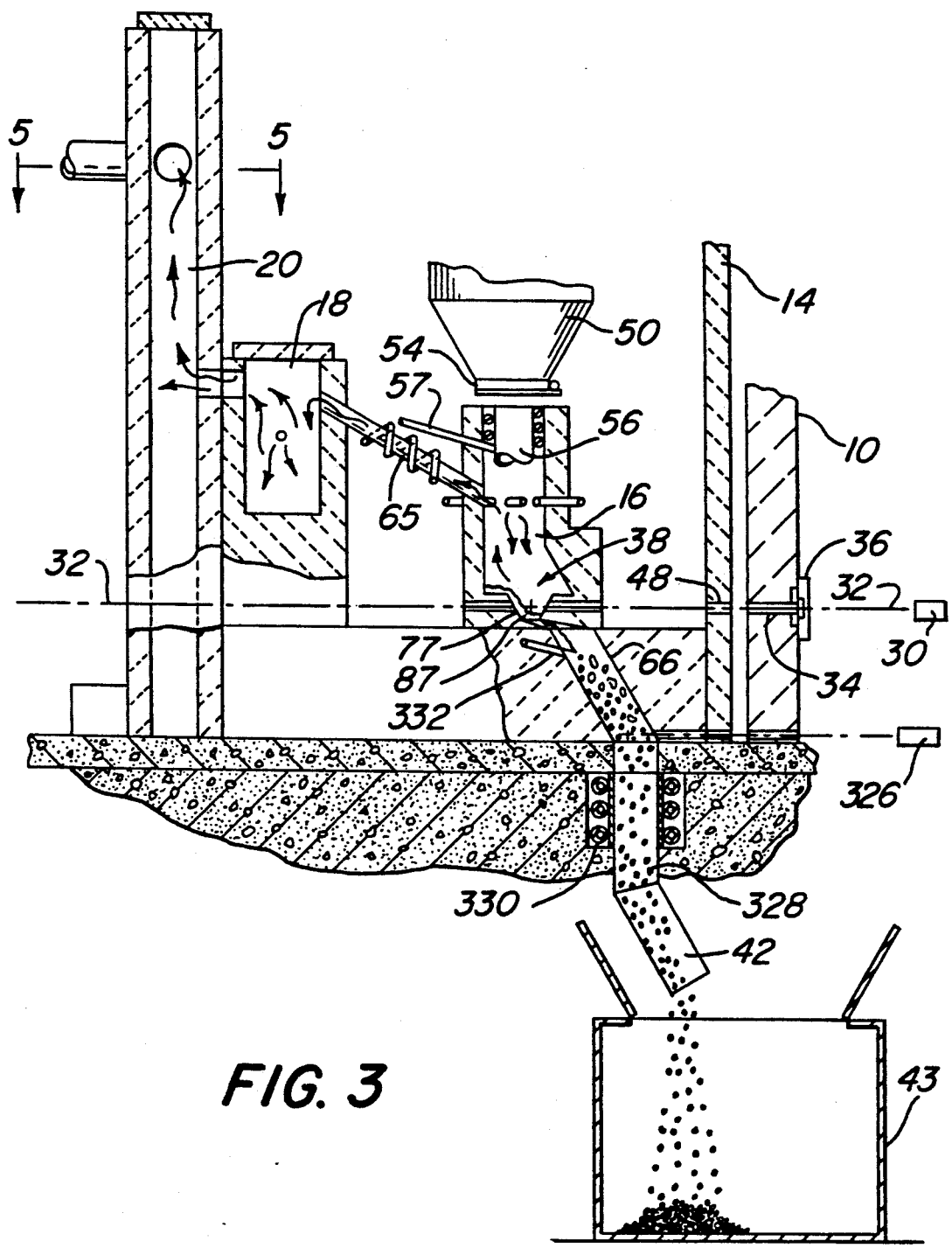
FIG. 3 is a vertical sectional view of the primary and secondary chambers taken along the lines 3—3 in FIG. 2.

FIG. 3 illustrates the manner in which the slag is treated as it flows from the primary reaction chamber 16. The liquid slag stream flows down exit tube 66. In the course of its flow down the tube, the slag begins to harden. The liquid flows through a stream of compressed air directed into the tube 66 through the pipe 332. The compressed air causes the liquid stream to separate into small globules which ultimately harden into individual pebbles as they are cooled by the heat exchanger 330. These slag pebbles then flow through tube 42 into the collection container 43.

The liquid stream next flows through the tube 328 which is surrounded by the heat exchanger 330. The lava is cooled by the heat exchanger 330.

A more detailed description of the process is as follows:

The process of reducing solid waste material to a more readily disposable slag is commenced by placing a mixture of solid waste (e.g. steel waste) and excitation material in reaction chamber 16. For example, a bed of 50% steel chips (10-15 lbs.) and 50% particulate coal (10-15 lbs.) together with a small quantity of wood chips (e.g. 1 lb.) is placed on the floor of the chamber. The starting material may also be 40% rebar, 30% wood chips and 30% coal by weight, for example. Coherent radiation at about 150 watts/cm$^2$ cw is directed at the bed which is positioned at the excitation point 38. The hopper 50 is filled with mixed metal chips, coal, glass and wood chips in readiness for feeding into the primary chamber 16 through the tube 56. The hopper 50 may be continuously filled from the tipping bay 53. Enough mixed steel chips and coal should be available to maintain the process once initiated. Present calculations indicate that the process should reduce the solid waste steel chips at a rate of approximately 10 lbs. per minute.

The particulate coal presently used in both the starter and feed mixes is so-called "rice coal". Rice coal is oval in shape (⅜" along its major axis, ¼" along its minor axis, and ¼ thick). Rice coal is readily available. However, other particle sizes (both smaller and larger) may be used. Generally larger particle sizes may be used for reaction chambers larger than the chamber 16 described herein.

The coherent radiation from laser 30 impinges upon the starter material until it reaches a temperature of 2,500° F. or greater. It has been found that the use of particulates as a starter material allows the heating process to commence rapidly within primary reaction chamber 16.

Within 3 to 20 seconds after initiation of the process, oxygen is introduced through the 6 lances 70 located near the bottom of the chamber 16. The oxygen is introduced at approximately 2,000 ft$^3$/hr. (333 ft$^3$/hr. per lance). A range of 900 to 1,200 ft$^3$/hr may be used depending upon the effect on air quality in the wind tunnel. The oxygen from lances 70 is emitted into the primary reaction chamber 16 at an angle so that the gases within that chamber are forced to swirl within the chamber, which helps distribute the heat throughout the chamber. Upon introduction of the oxygen, the temperature of the starting material rises within chamber 16 to over 3,000° F. This takes about 5 to 45 minutes until the starting mixture fuses to puddles of liquid.

As the starter material reaches operating temperatures, the gate valve 54 is opened and the particulate solid waste and excitation material such as coal mix is continuously fed into the primary reaction chamber. As noted previously, this mix may be preheated in the tube 56 by the effluent gases which are returned through tube 57 by compressor 316 although such preheating cannot be initiated until after the process is commenced.

The solid waste and excitation material is injected into chamber starting at a rate of 1 to 2 lbs./min. The material is fed at this rate until a 9" diameter liquid bath about ½"deep forms in the bottom of chamber 16. The feed rate is then increased to 3 lbs./min. until the bath grows to a depth of 2 inches. The feed rate is then increased to 33 lbs./min., which is the typical operating rate for this particular system. The energy for fusing the solid waste (steel chips in this example) is supplied by the particulate coal; i.e. 3,000,000 btu/hr. Once the process is underway, the compressor 316 recirculates effluvia into the chamber 16 at a rate of 400–600 ft$^3$/hr.

The feed rates and composition of the feed mix will be adjusted empirically depending upon the solid waste material being combusted. Specifically, the parameters are adjusted to reach chamber temperatures in excess of 2,000° F., that is in the range of 2,000–3,000° F.

Once the slag has filled chamber 16 as described above, it flows down tube 66. The slag can be converted into a pebble-like form by a blast of compressed air from tube 332 or can be poured into a mold. As the slag pebbles leave tube 66, the coherent radiation from laser 326, if used, causes them to anneal and thereby better lock in any remaining metals or other constituents. The slag then falls through tube 328 surrounded by heat exchanger 330 which cools it further. The hardened slag flows through tube 42 into the container 43. When container 43 is filled, it may be moved outdoors to allow the slag to reach ambient temperatures and thereafter be transferred to another site.

The hot gaseous effluvia from the heating process flows up tube 64 into the chamber 18. The effluvia flowing into the secondary chamber 18 includes products of combustion and inorganics.

It has been found, however, that the level of PIC's produced using the method and apparatus of the present invention is low. The high temperature in chamber 16 (above 2,000° F.) leave virtually no PIC's in the effluvia. The liquid stream is at 3,000° F+. The temperature above the bath is 2,000° F.-2,500° F. Measurements indicate that 99% of the undesirable materials are being transformed in the chamber 16.

Chamber 18 greatly enhances the total output of the system by providing an efficient mean for treating the effluvia. This allows better control of the effluvia for ultimately exhausting it into the atmosphere. Specifically, the effluvia is rapidly cooled as it passes from chamber 16 (2,300° F.-2,400° F. at the entrance to tube 61) into and out of chamber 18. This cooling removes most of the particulate matter as the effluvia temperature decreases by 1,000° F. to 1,500° F. causing the particulate to precipitate in chamber 18. Residence time in chamber 18 is about 2 seconds.

The effluvia is drawn from the secondary chamber 18 through the primary stack 20 where it is further cooled. The heated effluvia then passes through precipitator 25.

The precipitator 25 ionizes remaining the particulate matter in the effluvia, such as the heavy metals and arsenic, and causes them to collect on or about the electrodes. The precipitator 25 includes petcocks 23 which permit the collected particles to be removed.

The effluvia flows up the secondary stack 22 and through the heat exchanger 26 into the cooling chamber 28 at approximately 500° F. Within the cooling chamber 28, the heat exchanger 260 reduces the temperature of the effluvia to between 100° and 200° F.

The effluvia then flows through one or both of the precipitators 24 and 24' where additional remaining particulate matter is substantially electrostatically removed from the effluvia.

The vacuum pump 302 forces the effluvia to flow from chamber 300 through a pipe below the surface of pool 304 which is filled with water.

The water neutralizes certain oxides remaining in the effluvia. Thus sulphur dioxide ($SO_2$) becomes sulphur trioxide ($SO_3$) which, in the water, converts to sulphuric acid ($H_2SO_4$). Moreover, any ozone ($O_3$) is converted to oxygen.

The effluent is bubbled up from pipe 306, to pipe 305 into 3 carbon filters 310 (combined capacity 300–500 ft$^3$/min.) and then passes into the wind tunnel 312. Pump 307 assists in this process. The fan 316 mixes the effluent with atmospheric air. At this point the effluent consists of dilute carbon dioxide and water vapor. This effluent is freely exhausted into the atmosphere at 60° F.-70° F.

As previously noted, some of the effluvia is returned to the secondary reactor and used in the process by compressor 316 operating at 125 lbs/in$^2$. The recirculated gases are injected into the primary chamber at a rate of 100 to 300 CFH. The rate of injection may be increased to greater than 600 CFH for short intervals for better mixing as required.

In a test conducted using the apparatus and process of the present invention, a sample of solid waste having the following constituents was reduced:
Rice Coal—5-10% by weight
Aluminum and Steel Chips—75% by weight
Waste Glass or Sand—10% by weight
Wood Chips—1-5% by weight
Miscellaneous—5% by weight
Injection rate—33 lbs/min
$O_2$ (CFM)—2,000 CFH; 33.3 CFM
$O_2$ (PSI)—100 psi.

The aluminum and steel chips are industrial waste such as aluminum stampings and cold rolled steel shavings. Waste glass simulates the presence of silica. Wood chips provide additional fuel. And the miscellaneous materials include cutting oils and debris.

The burn lasted from 11:20 A.M. to 1:05 P.M. and was monitored every 5 minutes.

The air quality and temperature readings for the effluent were as follows:

AIR QUALITY AND TEMPERATURE READINGS:

| | Activated Carbon Exhaust from Filter 310 | | | | External to Wind Tunnel 312 | | | | | | |
|---|---|---|---|---|---|---|---|---|---|---|---|
| Time | SO₂ | LEL | CO | O₂ | SO₂ | LEL | CO | O₂ | Temp | Argon | Partclt |
| 10:39 | 0.0 | 2 | 0 | 21.2 | 0.0 | 2 | 0 | 21.3 | 66.1 | 1.49 | .119 |
| 11:20 | 0.0 | 2 | 45 | 21.7 | 0.0 | 2 | 0 | 21.3 | 66.9 | 2.24 | .117 |
| 11:25 | 0.7 | 3 | 86 | 22.8 | 0.0 | 2 | 1 | 21.3 | 67.0 | 4.20 | .117 |
| 11:30 | 0.0 | 3 | 113 | 23.1 | 0.0 | 2 | 3 | 21.3 | 67.1 | 3.67 | .117 |
| 11:35 | 1.4 | 3 | 112 | 24.5 | 0.0 | 2 | 4 | 21.3 | 67.2 | 2.76 | .119 |
| 11:40 | 1.1 | 3 | 86 | 26.7 | 0.0 | 2 | 7 | 21.4 | 67.4 | 2.50 | .116 |
| 11:45 | 0.3 | 3 | 147 | 26.8 | 0.0 | 2 | 10 | 21.5 | 67.6 | 2.40 | .115 |
| 11:50 | 0.0 | 3 | 215 | 25.3 | 0.0 | 2 | 8 | 21.7 | 67.7 | 3.40 | .111 |
| 11:55 | 2.0 | 4 | 196 | 24.8 | 0.0 | 2 | 10 | 21.6 | 67.8 | 3.00 | .110 |
| 12:00 | 4.0 | 4 | 184 | 24.4 | 0.0 | 2 | 14 | 21.6 | 67.9 | 2.72 | .110 |
| 12:05 | 1.7 | 4 | 189 | 26.2 | 0.1 | 3 | 12 | 21.6 | 68.0 | 2.40 | .112 |
| 12:10 | 1.7 | 4 | 171 | 26.1 | 0.2 | 3 | 9 | 21.6 | 68.1 | 2.27 | .108 |
| 12:15 | 0.3 | 5 | 574 | 24.8 | 0.3 | 3 | 10 | 21.7 | 68.3 | 1.51 | .107 |
| 12:20 | 0.7 | 7 | 728 | 23.8 | 0.2 | 3 | 14 | 21.6 | 68.4 | 2.00 | .107 |
| 12:25 | 0.9 | 7 | 570 | 23.7 | 0.1 | 3 | 21 | 21.6 | 68.5 | 1.53 | .107 |
| 12:30 | 0.9 | 7 | 546 | 24.4 | 0.1 | 3 | 23 | 21.6 | 68.7 | 1.40 | .092 |
| 12:35 | 0.6 | 5 | 518 | 25.0 | 0.1 | 2 | 21 | 21.5 | 68.8 | 1.23 | .100 |
| 12:40 | 1.0 | 5 | 528 | 25.2 | 0.2 | 2 | 38 | 21.6 | 68.9 | 0.85 | .093 |
| 12:55 | 0.0 | 4 | 485 | 26.5 | | | | | | | |
| Averages (excluding the preliminary reading at 10:39 a.m., taken before test started) | | | | | | | | | | | |
| | 0.96 | 4 | 305 | 24.8 | 0.07 | 2 | 12 | 21.5 | 67.9 | | |

Legend
SO₂ = Sulphur Dioxide measured in parts per million (PPM)
LEL = Lower Explosive Limit measured in percent (%) by volume
CO = Carbon Monoxide measured in parts per million (PPM)
O₂ = Oxygen measured in percent (%) by volume
Temp = Temperature measured in degrees (°) Fahrenheit
Argon = Argon laser measuring opacity in milliwatts (mW)
Partclt = Background Particulate readings in milliwatts (mW)

A solid sample of slag collected from another test rund one at about the same time and using substantially the same waste and operating parameters was tested by an independent laboratory with these results:

| E. P. Toxicity (Recovery 95%+) | |
|---|---|
| Arsenic (As) | less than 0.05 |
| Cadmium (Cd) | less than 0.05 |
| Chromium (Cr) | less than 0.05 |
| Lead (Pb) | less than 0.05 |
| Selenium (Se) | less than 0.05 |
| Silver (Ag) | less than 0.05 |
| Barium (Ba) | less than 0.1 |
| Mercury (Hg) | less than 0.005 |

Other hazardous wastes may be treated in the same manner. Infectious waste is reduced in the primary reaction chamber 16.

The process has been described for fusing steel waste and coal as the excitation material. The process is also applicable to incinerator ash and rebar as a solid waste.

The present invention may be embodied in other specific forms without departing from the spirit or essential attributes thereof and, accordingly, reference should be made to the appended claims, rather than to the foregoing specification, as indicating the scope of the invention.

What is claimed is:

1. Apparatus for removing harmful constituents from non-combustible solid waste material, comprising:
   means for continuously feeding a particulate mix of said solid waste material and a combustible excitation material as a source of heat energy into a reaction chamber, 'a reaction chamber,
   means for introducing oxygen into said reaction chamber,
   said reaction chamber having means for reacting the mix in said chamber in the presence of oxygen until the solid waste becomes a molten slag and the temperature within the chamber above the bath of molten slag is high enough to destroy substantially all of the harmful constituents of the gaseous effluent generated by the formation of the molten slag,
   means for conducting excess molten slag from the reaction chamber,
   means for conducting the gas and particulate effluent generated by the formation of the molten slag from the reaction chamber into a second chamber,
   said second chamber having means for rapidly cooling the effluent therein to cause particulate material to precipitate out of the effluent,
   and means for treating the effluent to remove substantially all of the remaining particulate and harmful constituents to achieve acceptable environmental quality,
   and means for releasing the effluent into the atmosphere.

2. Apparatus for removing harmful constituents from non-combustible solid waste material in accordance with claim 1 wherein said means for treating the effluent includes at least one electrostatic precipitator.

3. Apparatus for removing harmful constituents from non-combustible solid waste material in accordance with claim 1 includes a wind tunnel for treating the effluent includes an electrostatic precipitator, filtering means, and a liquid bath, and means for causing said effluent to pass through said liquid bath.

4. Apparatus for removing harmful constituents from non-combustible solid waste material in accordance with claim 1 includes a wind tunnel for mixing the treated effluent with atmospheric air prior to releasing it into the atmosphere.

5. Apparatus for removing harmful constituents from non-combustible solid waste material in accordance with claim 2 wherein said electrostatic precipitator comprises an elongated tube, a set of elongated electrodes within said tube, said electrodes

* * * * *